(12) United States Patent
Lockwood (10) Patent No.: US 8,717,187 B2
(45) Date of Patent: May 6, 2014

(54) SOLAR POWERED DEVICES USING LOCATION-BASED ENERGY CONTROL AND METHOD FOR OPERATION OF SOLAR POWERED DEVICES

(75) Inventor: Aaron John Lockwood, Victoria (CA)

(73) Assignee: Carmanah Technologies Corp., Victoria, British Columbia (CA)

( * ) Notice: Subject to any disclaimer, the term of this patent is extended or adjusted under 35 U.S.C. 154(b) by 187 days.

(21) Appl. No.: 13/382,494

(22) PCT Filed: Jul. 8, 2009

(86) PCT No.: PCT/CA2009/000929
§ 371 (c)(1),
(2), (4) Date: Jan. 5, 2012

(87) PCT Pub. No.: WO2011/003165
PCT Pub. Date: Jan. 13, 2011

(65) Prior Publication Data
US 2012/0098669 A1    Apr. 26, 2012

(51) Int. Cl.
*G08B 21/00* (2006.01)

(52) U.S. Cl.
USPC ............... 340/657; 340/636.12; 340/981

(58) Field of Classification Search
USPC ........... 340/657, 331, 945, 981, 636.1, 636.2, 340/636.17, 636.12, 660, 661, 691.6, 692
See application file for complete search history.

(56) References Cited

U.S. PATENT DOCUMENTS

| | | | |
|---|---|---|---|
| 4,481,562 A | 11/1984 | Hickson | |
| 4,484,104 A | 11/1984 | O'Brien | |
| 4,751,622 A | 6/1988 | Williams | |
| 6,028,597 A | 2/2000 | Ryan, Jr. et al. | |
| 6,045,089 A * | 4/2000 | Chen | 244/12.1 |
| 6,240,737 B1 * | 6/2001 | Albiez | 62/228.5 |
| 6,553,500 B1 * | 4/2003 | Sterzik et al. | 713/300 |
| 6,685,334 B2 | 2/2004 | Kenny et al. | |
| 2008/0078435 A1 * | 4/2008 | Johnson | 136/206 |
| 2008/0215186 A1 | 9/2008 | Reid et al. | |
| 2009/0129067 A1 * | 5/2009 | Fan et al. | 362/183 |
| 2010/0198421 A1 * | 8/2010 | Fahimi et al. | 700/291 |

FOREIGN PATENT DOCUMENTS

EP    1957878 A2    8/2008

* cited by examiner

*Primary Examiner* — Daniel Previl
(74) *Attorney, Agent, or Firm* — Quarles & Brady LLP; Gavin J. Milczarek-Desai (57) ABSTRACT

A solar powered device and a method of operating such a device to allow it to receive and store information about its physical location, from which it can determine the minimum expected solar energy levels that will be available to it. Based on the minimum expected levels, the device then limits its configurable settings to preferably enable only those configurations having maximum energy demands that can be met or exceeded by the minimum expected energy levels.

36 Claims, 5 Drawing Sheets

SOLAR POWERED DEVICES USING LOCATION-BASED ENERGY CONTROL AND METHOD FOR OPERATION OF SOLAR POWERED DEVICES

FIELD OF THE INVENTION

This invention relates to solar powered devices that can be configured for optimal use based on the geographic location of the device and the solar environment associated with that location, and a method for operating such devices.

BACKGROUND OF THE INVENTION

Solar powered products often include a means of configuring their energy consumption based on battery and battery charge parameters. This allows the energy consumption of the device to be matched with the amount of solar energy the device receives and stores, maximizing the performance of the device for a given location and preventing failure of the device at a critical time.

For example, a solar powered light may have an adjustable light intensity, which is generally set as a percentage of the light's maximum brightness. A second configurable parameter is the flash pattern, which is generally set as a given number of illuminations in a specified period of time. It is important that the light be able to receive and store sufficient solar energy to allow it to illuminate to the specified intensity for the specified number of flashes.

The maximum amount of energy a device can receive from the sun and store can vary greatly, depending on the geographic location of the device. For example, Los Angeles, Calif. typically receives three times the solar energy of Seattle, Wash. Accordingly, a solar powered light optimized for Los Angeles may not work for certain applications in Seattle.

It is therefore known to use power management systems to try to optimize the use of a given lighting system for the ambient conditions.

U.S. Pat. No. 6,028,597 discloses a power management system for maintaining constant brightness of the lighting elements in signage by controlling the duty cycle of a light controller. The system decides what illumination level can be maintained for a given period of time, taking into account such variables as ambient light conditions, level of charge remaining in the batteries, the availability of an alternative power supply, the length of dark time during which the lights are expected to be illuminated, any expected periods of cloud cover or solar absence, and the position of the solar array relative to the sun. The system then determines the maximum illumination level that can be maintained, having regard to all of the variables, and sets a duty cycle that is achievable by the power available to the system for the anticipated time period. However, in areas where less light than anticipated is available, or where the dark time is longer than anticipated, the system could deplete its power level and be unable to maintain the programmed level of illumination. Further, there is no assurance that the computed maximum level of illumination will meet the minimum level of illumination required by the installer, decreasing the effectiveness of the system once available power levels begin to drop.

U.S. Pat. No. 6,685,334 teaches extending the life of associated energy storage devices by selectively charging and discharging the devices, while U.S. Pat. No. 4,751,622 teaches extending the operational life of a solar powered construction light with a self-controlled on/off cycle. However, neither patent teaches any means to ensure that a minimum level of sunlight required by the installer is available at any given time. It is therefore not certain that sufficient solar power would be available to operate the devices during the life cycle of the devices.

U.S. Pub. No. 20080215186 describes a system and method for environmental control, in which environmental values such as available environmentally generated electricity are measured. A priority device interfaces with a user to define a goal that corresponds to a hierarchy of environmental objectives. The control module of the system then uses a mathematical algorithm to adjust its own components to correlate the environmental values and the user-defined goal so as to generate a set of output device settings. The control module is electrically coupled to the output device to facilitate adjustment according to the output device settings, so as to affect the environmental values in a manner consistent with the goal. However, there is no information relating to the process followed by the control module if the user has set goals that the system is incapable of reaching, given the environmental factors at the system's geographic location.

European Pub. No. EP1957878 also discloses a method for distributing the power of a power supply system to various demands, i.e. heating, hot water, and power generation. The power is distributed based on a prediction about the temporal availability of the amount of solar power by taking into account weather data and a prediction about the utilization of each of the three types of power consumption based on empirical values in such a way that the utilization ratio is maximized. Again, this method does not contemplate situations where sufficient power to meet the various demands of the installer can not be generated.

Further, it may be preferable to design a system of solar powered devices to be user-configured, to maximize the flexibility of a system and the elements within the system. This allows the installer to personalize a given system for specific applications. However, minimal guidance is often provided or accepted to assist the installer in calculating and implementing the optimal configuration. As a result, an installer may configure a device to desired parameters for his particular application, only to find that the device does not have enough energy to operate as instructed. This results in user frustration.

U.S. Pat. No. 4,481,562 discloses a self-contained signaling apparatus including a solar generator that can be directionally adjusted based on the geographical position of the apparatus, in order to maximize the amount of sunlight gathered with the photoelectric cells on the solar generator. However, because there is no means to verify that adequate sunlight will be available, the patent also teaches that the solar generator preferably includes several extra photoelectric cells, in order to ensure that sufficient solar energy may be gathered to power the apparatus. U.S. Pat. No. 4,484,104 also discloses a solar powered lighting system in which the solar cell array can be physically directed towards the anticipated position of the sun. In this case, there is no discussion of what happens if insufficient sunlight is available to charge the solar array and power the lights.

It is therefore an object of the present invention to provide a solar powered device that overcomes one or more of the foregoing deficiencies. The present invention provides a solar powered device that stores information about its local solar environment, thereby allowing the energy consumption of the device to be tailored to the particular geographical location of the device and to manage the operating parameters that will be permitted for the device.

These and other objects of the invention will be better understood by reference to the detailed description of the preferred embodiment which follows.

SUMMARY OF THE INVENTION

This invention relates to a solar powered device having means to store information about its immediate solar environment. The information can then be used to set a limit on the anticipated energy consumption of the device, as a function of the energy level that can be sustained by the local solar environment. The limit is applied to prevent a user from choosing operational parameters that exceed the solar energy capacity for that solar region.

The solar powered device may have means for a user to input information about the geographic location of the device, from which the solar insolation of the device can be determined. Alternatively, the device may autonomously determine its location and insolation once it is installed and activated.

Once the device knows its location, along with the amount of solar energy that might be expected throughout the year, the device restricts the combinations of operational parameters for the device to those that can be sustained by the amount of solar energy available in that location. This assists in preventing critical failures of the device due to unreasonable energy demands.

In one aspect, the invention comprises an apparatus for controlling a solar-powered device comprising a rechargeable battery, the apparatus comprising means for determining a location of the solar-powered device; memory means for storing the location and solar insolation information related to the location; a user interface for receiving a set of operational parameters for the solar-powered device from a user, the set of operational parameters comprising at least one operational parameter; and a controller configured to determine a minimum energy requirement to operate the solar-powered device according to the set of operational parameters and to compare the minimum energy requirement to a maximum available energy level determined from the solar insolation information; the controller being further configured to operate the solar-powered device according to the set of operational parameters only if the minimum energy requirement is less than the maximum available energy level.

In a further aspect, the controller may be configured to receive the location from the user through the user interface. The user may use a reference means to determine the location, which may be a simple geographic reference, or which may correlate the location to a solar zone comprising a geographical area of substantially uniform solar insolation, and the user then may enter the solar zone into the user interface. Alternatively, a GPS sensor may be used to obtain the location of the device.

In a further aspect of the invention, if the minimum energy requirement is greater than the maximum available energy level, the solar-powered device may comprise means to return an error message to the user. The error message may comprise an audible or visible signal.

In another aspect, the invention comprises a solar-powered device, comprising at least one rechargeable battery to power the device; a solar panel operatively coupled to recharge the rechargeable battery; memory means for storing solar insolation information relating to a location of the solar-powered device; a user interface for entering a set of operational parameters into the memory means, the set of operational parameters comprising at least one operational parameter; and a controller for controlling the device based on the solar insolation information and the set of operational parameters; the memory means comprising computer-readable media containing a code for execution by the controller which, when executed, performs the steps of: determining a maximum available energy level from the solar insolation information; determining a minimum energy requirement to operate the solar-powered device according to the set of operational parameters; comparing the minimum energy requirement to the maximum available energy level; and operating the solar-powered device according to the set of operational parameters only if the minimum energy requirement is less than the maximum available energy level. The solar-powered device may further comprise means to return an error message to a user if the minimum energy requirement is greater than the maximum available energy level; the error message may be an audible or visible signal.

In a further aspect, the code in the memory means, when executed, may further perform the steps of determining an amended minimum energy requirement to operate the solar-powered device upon receiving an amended set of operational parameters through the user interface, the amended set comprising at least one amended operational parameter; and operating the controller according to the amended set of operational parameters only if the amended minimum energy requirement is less than the maximum available energy level.

In a further aspect, the controller may be configured to receive the location from a user through the user interface, or may comprise a GPS sensor to determine the location. If the user is to enter the location, the user may use a reference means to determine the location, which may be a simple geographic locator, or may correlate the location to a solar zone comprising a geographical area of substantially uniform solar insolation, and the user enters the solar zone into the user interface.

In a further aspect of the invention, the user interface may be integral with the solar-powered device or the controller, or may comprise a wired or wireless device in communication with the controller.

In another aspect, the invention comprises a method for operating a solar-powered device, comprising the steps of determining a location of the solar-powered device; correlating the location to a solar insolation level; determining a maximum available energy level from the solar insolation level; receiving a set of operational parameters for the solar-powered device, the set comprising at least one operational parameter; determining a minimum energy requirement to operate the solar-powered device according to the set of operational parameters; comparing the minimum energy requirement to the maximum available energy level; and operating the solar-powered device according to the set of operational parameters only if the minimum energy requirement is less than the maximum available energy level. The location determination may be carried out with a GPS sensor or other reference means, such as a handheld GPS device or a map.

In a further aspect, the step of determining a minimum energy requirement may comprise a consideration of operational information relating to the battery, the solar panel and/or the lighting element. The step of determining the maximum available energy level comprises a consideration of operational information related to the solar environment of the device, such as the solar insolation levels, light levels and duration, and temperature levels.

In a further aspect, the method of the invention may comprise the further steps of receiving an amended set of operational parameters, the amended set comprising at least one amended operational parameter; determining an amended minimum energy requirement to operate the solar-powered device according to the amended set of operational parameters; and operating the solar-powered device according to the amended set of operational parameters only if the amended minimum energy requirement is less than the maximum available energy level.

In yet a further aspect, the method of the invention may further comprise the step of returning an error message to a user if the minimum energy requirement is greater than the maximum available energy level, which may consist of providing an audible or visible signal to a user. The method may further comprise the steps of accepting an override command from the user in response to the error message; and operating the solar-powered device according to the set of operational parameters. Alternatively, the solar-powered device may be operated according to the operational parameter after providing the audible or visible signal to the user, without requiring an override command.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which.

DETAILED DESCRIPTION OF THE PREFERRED EMBODIMENT

The solar powered device is illustrated in the present application as a solar powered lighting device, but the principles of the invention are applicable to any solar powered device, such as solar powered signage.

Figure 1:
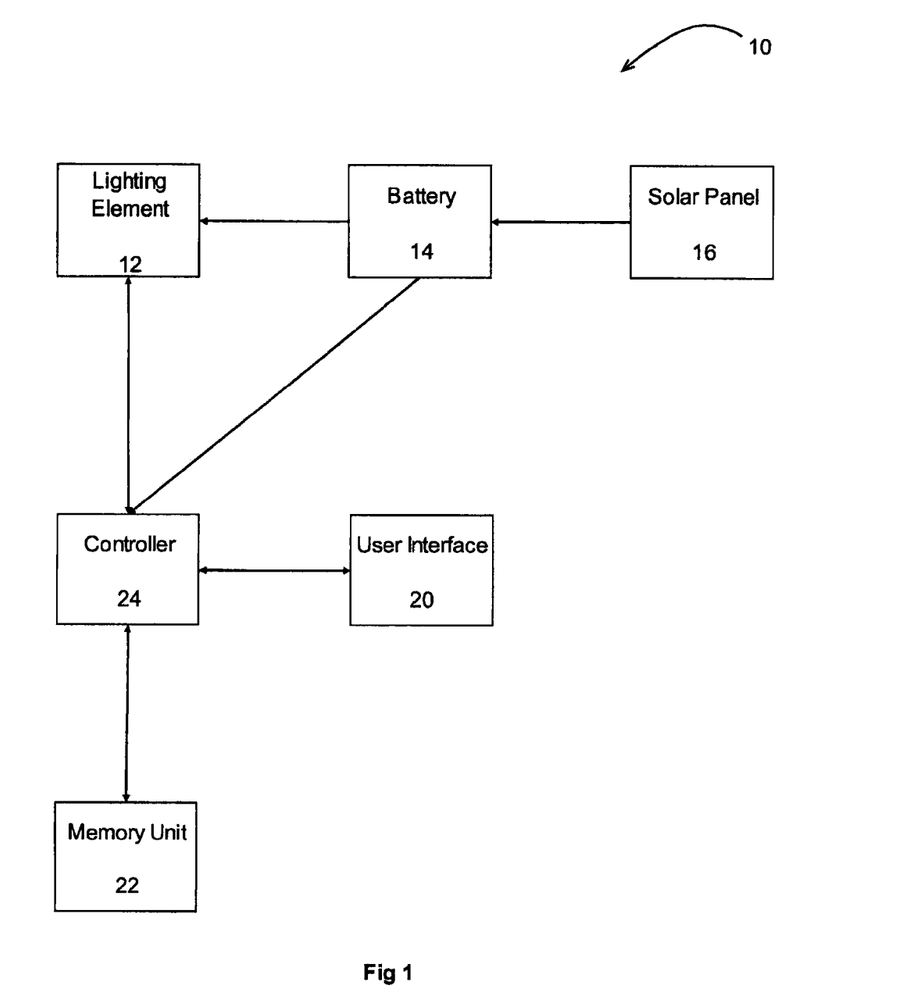
FIG. 1 is a block diagram of a solar device according to the present invention.

Referring to FIG. 1, the solar powered device 10 comprises at least one lighting element, such as a beacon lamp 12, powered by at least one rechargeable battery 14. Lighting element 12 may be a light emitting diode (LED) or any other suitable light element capable of providing the required light intensity and durability for the solar powered device specifications. The battery 14 receives power from a solar panel 16 which converts solar energy into electrical energy that can be stored by the battery 14. The device 10 further comprises a user interface 20, through which a user may enter a set of one or more desired operating parameters upon installation, or may change one or more parameters during the lifetime of the device 10. The device 10 further comprises a memory unit 22, in which data such as the operating parameters and previous settings may be stored. Controller 24 is responsible for processing operational parameters from the user interface 20 with operational information from the memory unit 22. The controller 24 may also communicate information about the operational status of the device 10 through user interface 20.

The user interface 20 between the user and the controller 24 may comprise an integral panel within device 10, or may comprise a wired or wireless device in operative communication with the controller 24, such as a portable smartphone, a laptop computer, a specially provided interface module, or any other suitable communication device. Alternatively, the device 10 may comprise an onboard or remote user interface 20 to enter simple configuration commands, along with means to communicate with a portable wired or wireless device acting as a second user interface 20 for more complicated configuration commands.

The user can input a set of operational parameters, including, for example, effective intensity of the light emitted; the flash pattern, if intermittent operation is required; the ambient light levels at which the device should be activated and deactivated; the atmospheric transmissivity in the particular location; or any other configurable setting that creates an energy load. The user may also enter a target battery life, setting a specified length of time for which the device should operate before the battery or solar panel requires replacement. In this context "set" means at least one operational parameter, or a group of one or more operational parameters.

Operational information that may be stored within memory unit includes battery parameters, such as nominal voltage, quiescent current, current capacity, charge efficiency, charge acceptance and depth of discharge. The memory unit may also store information relating to the lighting element, such as the driver efficiency, the colour, typical voltage under various test and operating conditions, instantaneous current, efficacy under test current and test power, duty cycle, flash duration, optical efficiency, pulse width modulation limits, typical temperature fluctuations during operation and resistance of the circuit boards and associated internal elements. Information relating to the solar panel, such as nominal power, temperature offset at day time and standard test conditions, may also be stored.

Figure 2:
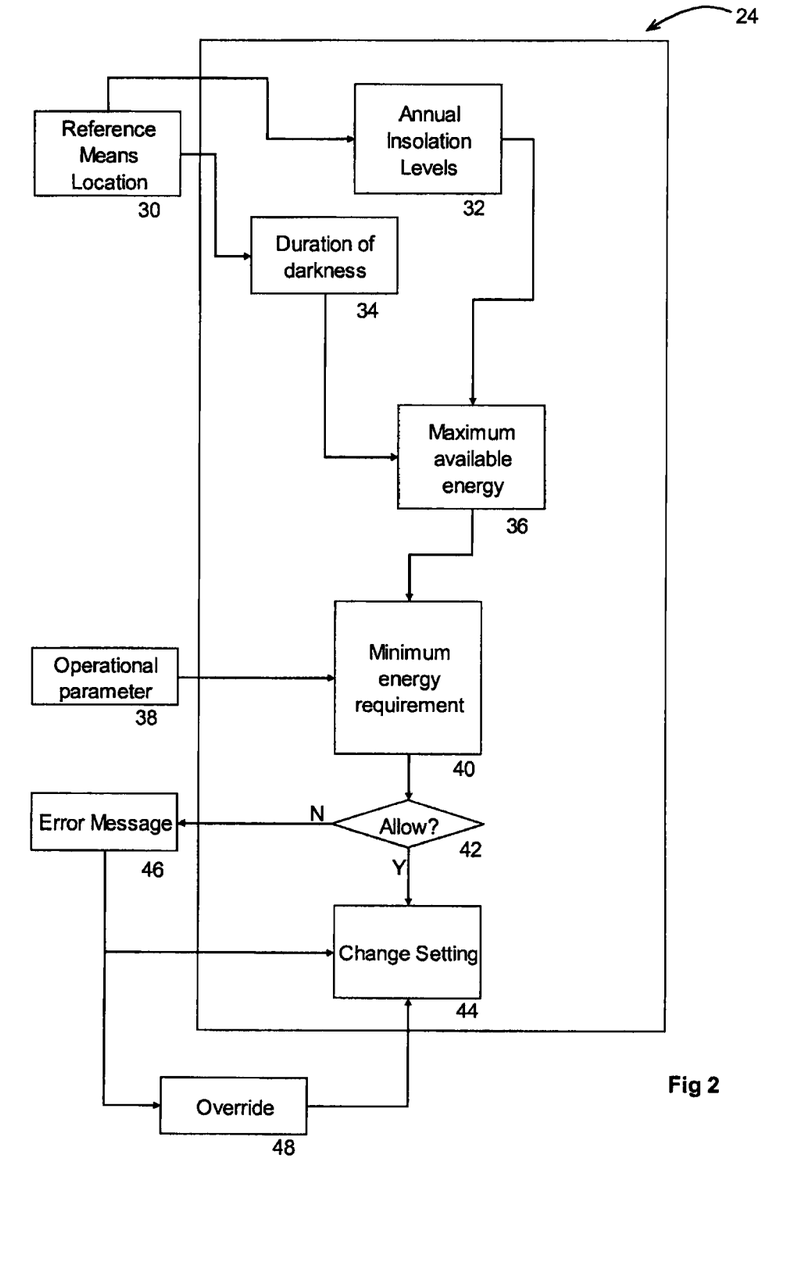
FIG. 2 is a schematic of a first embodiment of the method executed by the solar powered device of the present invention.
Figure 3:
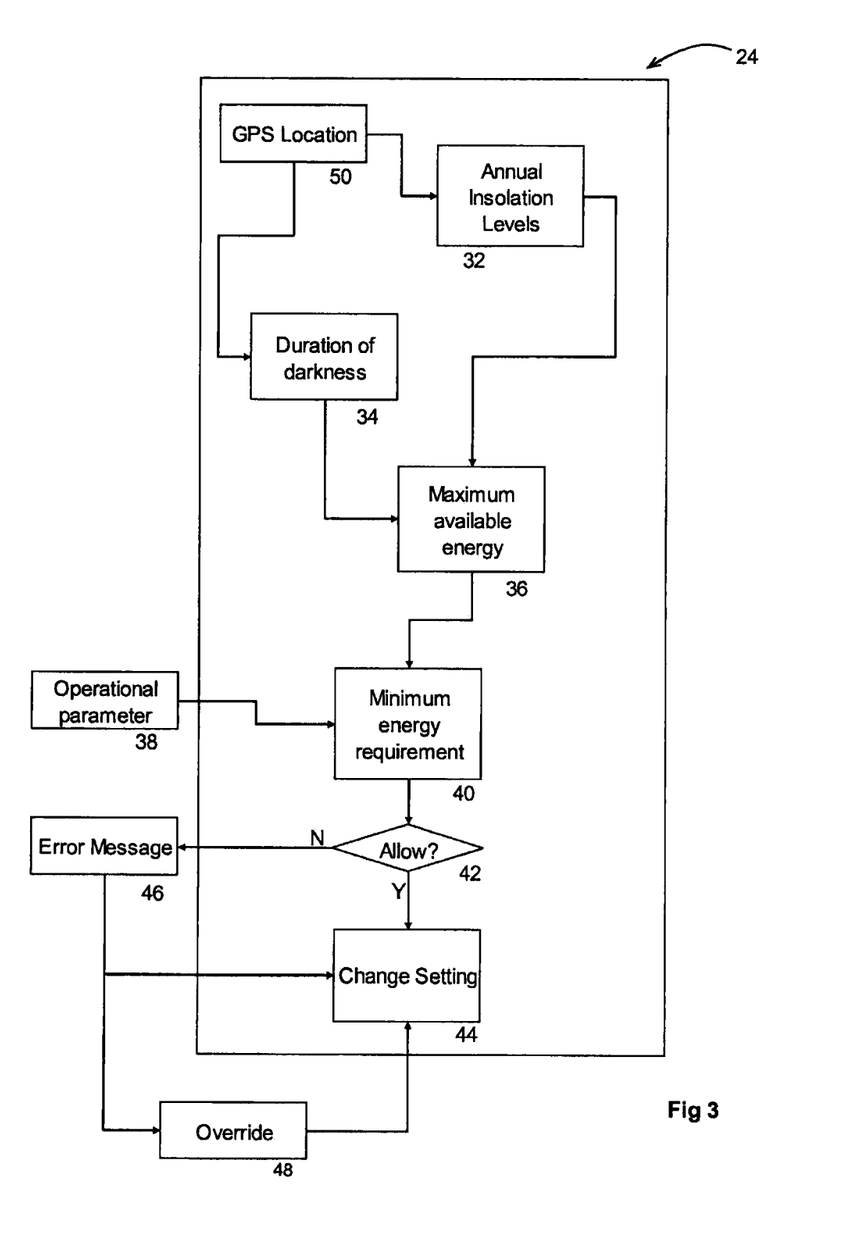
FIG. 3 is a schematic of a second embodiment of the method executed by the solar powered device of the present invention.

Operational information that is determined by the location of the solar powered device may also be stored within the memory unit, such as solar insolation levels; average, minimum and maximum day length; and average, minimum and maximum ambient temperatures. Preferably, such operational information is available before or when the user attempts to configure or reconfigure the operational parameters. The location may be determined and entered by the user using any suitable reference means 30, as shown in FIG. 2, or the information may be ascertained by the device itself using any suitable locating system, for example by reference to a GPS location sensor 50, as shown in FIG. 3. In the latter case, once the solar powered device determines its latitude and longitude, it can automatically correlate that location with the expected solar conditions stored in the memory unit.

If the installer is to input the location information as determined using reference means 30 through the user interface, he may use any suitable means to determine and enter location information such as the device's latitude and longitude, country or city name, or other geographical coordinates. Based on insolation maps, tables or other suitable means stored within the memory unit, the device would then be able to correlate the entered geographical information to a specific set of insolation levels 32. Suitable reference means 30 may comprise, for example, a handheld GPS device or a paper or electronic map. The user interface itself may contain a map or other electronic means from which the user can select the desired location.

Because insolation levels are related to geographic location, the parameters for individual locations can be very specific. For example, a location at the bottom of a canyon or at the foot of a mountain, which would receive a relatively low level of sunlight, will typically have lower insolation levels than the area on the rim of the same canyon or the area slightly further away from the mountain, which is likely to see more sunlight. This allows the user to customize a solar powered device as required.

Alternatively, the installer could directly enter the location information, by entering a number, a letter or any other code representing a geographic area with similar solar insolation conditions. In this case, the suitable reference means 30 may be a paper or electronic map that divides the relevant area into a number of solar zones, each having a substantially uniform solar insolation level, according to typical recorded levels. The user would find his location on the map and determine what zone to set the product to, and then would enter the associated code into the device interface. Alternatively, the reference means 30 may be any suitable means of correlating the geographic location of a user to a particular solar zone, such as a look-up table.

The controller 24 refers to the operational information stored in the memory unit to cross-reference the entered geographic position and insolation information and to correlate it to the minimum daily expected solar insolation levels 32 for that area. The controller 24 may also consider the duration of the longest night of the year 34 to determine the longest period that the device would be expected to operate without receiving further solar energy. Once the minimum expected daily energy availability and the maximum time during which power would be demanded are both known, the controller 24 can determine the maximum available energy levels 36 at that location.

The controller 24 considers the set of operational parameters 38 entered by the user, as well as the operational information related to the functions of the battery, lighting element and solar panel, in order to determine the minimum energy requirement 40 for the user's entered set of operational parameters 38.

Once the maximum available energy levels have been determined, the controller 24 determines 42 whether the load demands of the user-entered operational parameters can be met. The controller 24 allows the solar-powered device to operate 44 according to the user's selected set of operational parameters 38 only if the maximum available energy levels meet or exceed the minimum energy requirement 40 of those parameters 38. If a solar powered device is expected to operate indefinitely, the controller 24 would likely compare the lowest energy anticipated to be available in the winter with the load demands of the installer's configuration. If the controller 24 determines that there is unlikely to be sufficient power available at any one or more other times of the year, it rejects the operational parameters 38 entered by returning an error message 46 to the user, indicating that the requested operational parameters are not sustainable.

Alternatively, the maximum available energy levels may be used to limit the operational parameter settings offered to the user by reference to all of the parameter permutations that a user might wish to try. The user interface panel may be configured to offer a menu of choices to the installer, which would include only those load settings that can be met by the local maximum sustainable setting, and the controller 24 will reject an attempt to enter any other choices, by returning an error message 46 to the user. This prevents the user from choosing any configurations that demand too much energy for the local insolation level.

In certain cases, the user may wish to override the error message 46 returned by the controller 24. For example, if the solar powered device is only intended to operate for the summer months, the fact that insufficient solar energy will be available in the winter is less important. In this case, the user can instruct the controller 24 to override 48 the error message 46, and can then be allowed to program the device with the otherwise unsustainable parameters.

Alternatively, the user can enter a particular period of time during which the device is expected to operate as programmed. If the user's selected operational parameters 38 are sustainable for that specified period of time, for example the summer months, even if the parameters are not feasible for other times of the year, the controller 24 will accept the selected parameters.

In a further alternative, the error message 46 returned to the user may be a warning signal, such as a light or other visible or audible signal, to indicate that the user has selected unsustainable settings. The device may be programmed to simply accept those settings without requiring an override command 48.

Figure 4:
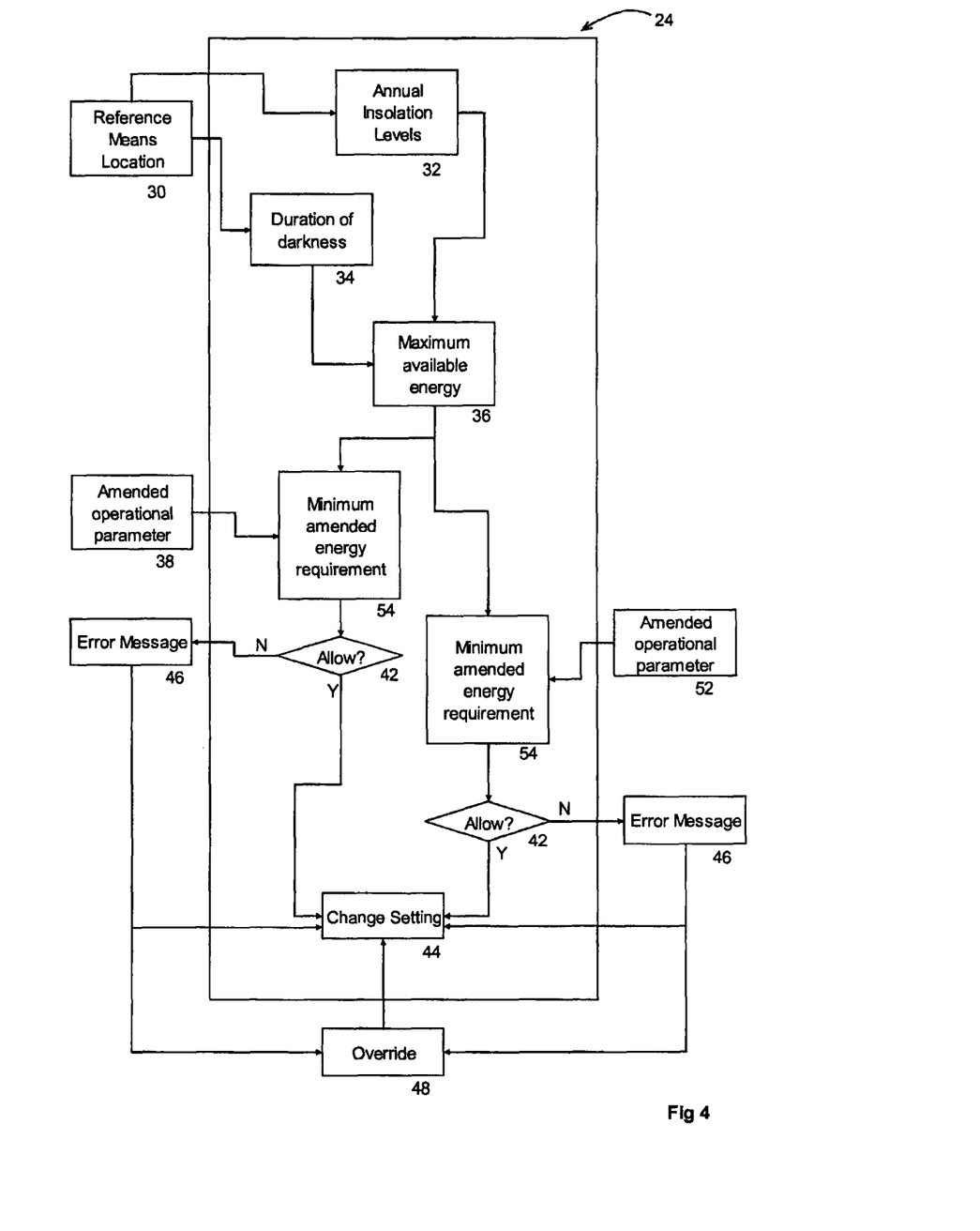
FIG. 4 is a schematic of a third embodiment of the method executed by the solar powered device of the present invention.
Figure 5:
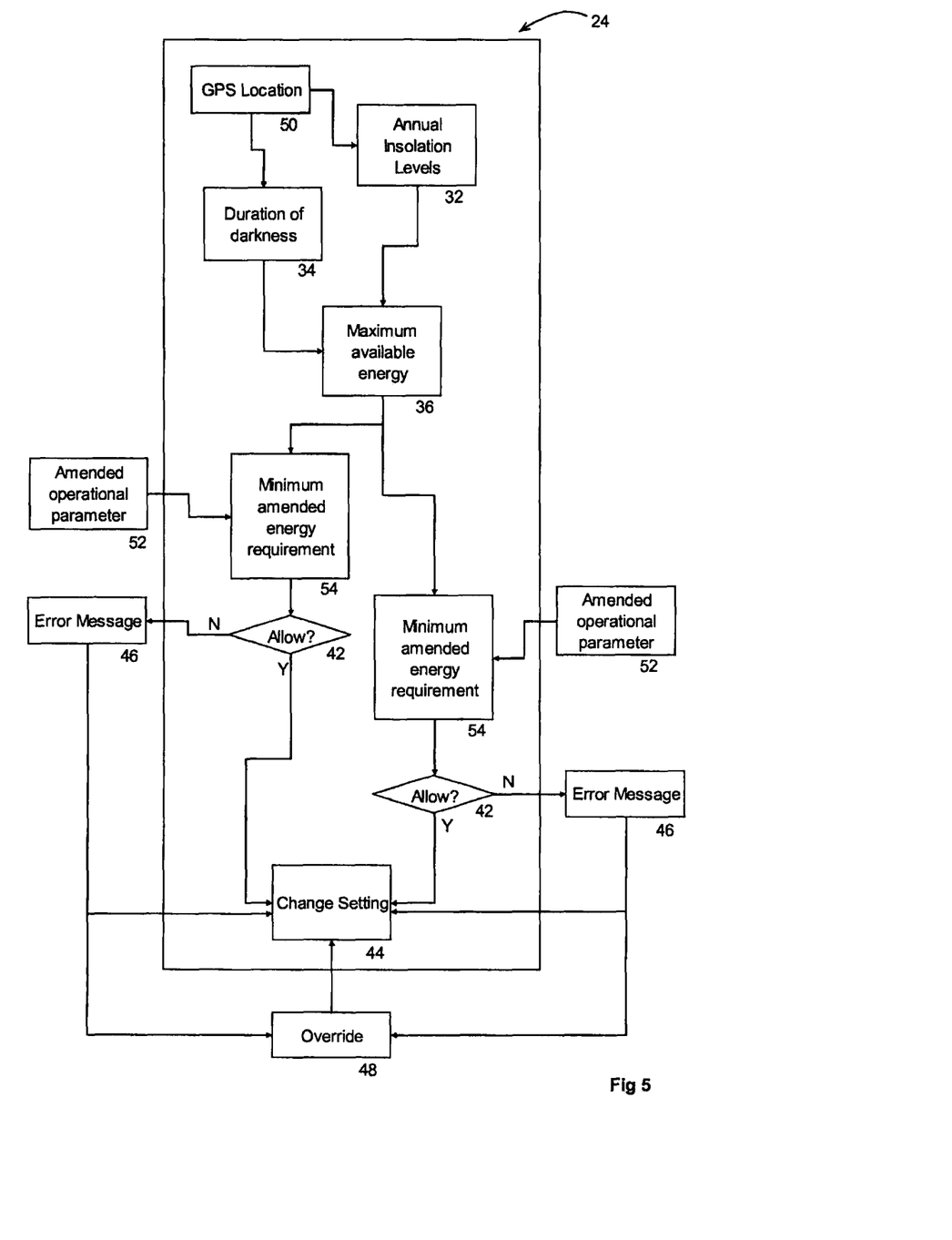
FIG. 5 is a schematic of a fourth embodiment of the method executed by the solar powered device of the present invention.

A similar procedure can be followed if the user wishes to change any of the operational parameters of the device. FIGS. 4 and 5 show a basic procedure to amend operational parameters 52. When the user enters the parameter to be changed, the controller 24 refers to the maximum available energy 36, as well as the other settings already entered for the device, in order to determine a minimum amended energy requirement 54, and then decides 42 whether the amended parameter 52 is acceptable. If so, the changes are made 44. If not, an error message 46 may be returned and the requested changes will not be made. Alternatively, the controller 24 may be configured to allow the user to override 48 the error message 46. In a further alternative, a simple warning signal may be provided to show the user that the amended parameters 52 are unsustainable, although the controller 24 will allow the user to proceed 44 with those settings without requiring further input, such as a specific override command.

Referring again to FIG. 1, the communication between the solar powered device and the user can be simple or complex, depending on the nature of the interface between the user and controller 24. For example a basic user interface panel 20 may include input means and a display to show error and/or warning messages. More advanced interfaces, such as those on a laptop computer or a specialized interface module, may include a larger menu, capable of offering more parameters or combinations of parameters, or a larger display, capable of offering more detailed information about why a certain combination of parameters is unsustainable, or suggestions to change other parameters if the user has amended a key parameter, in order to provide an acceptable combination.

It will be appreciated by those skilled in the art that the preferred and alternative embodiments have been described in some detail but that other modifications may be practiced without departing from the principles of the invention.

The invention claimed is:

1. An apparatus for controlling a solar-powered device comprising a rechargeable battery, said apparatus comprising:

means for determining a location of said solar-powered device;

memory means for storing said location and solar insolation information related to said location;

a user interface for receiving a set of operational parameters for said solar-powered device from a user upon initialization of said apparatus, said set of operational parameters comprising at least one operational parameter;

a controller configured to determine upon initialization a minimum energy requirement to operate said solar-powered device according to said set of operational parameters and to compare said minimum energy requirement to a maximum available energy level determined from said solar insolation information;

said controller being further configured to operate said solar-powered device according to said set of operational parameters only if said minimum energy requirement is less than said maximum available energy level and to reject said operational parameters during said initialization if said minimum energy requirement exceeds said maximum available energy level.

2. The apparatus for controlling a solar-powered device of claim 1 wherein said controller is further configured to receive said location from said user through said user interface.

3. The apparatus for controlling a solar-powered device of claim 2 further comprising a reference means for said user to determine said location.

4. The apparatus for controlling a solar-powered device of claim 3 wherein said reference means correlates said location to a solar zone comprising a geographical area of substantially uniform solar insolation, and said solar zone is entered into said user interface by said user.

5. The apparatus for controlling a solar-powered device of claim 1 wherein said user interface comprises a wireless device in communication with said controller.

6. The apparatus for controlling a solar-powered device of claim 1 wherein said user interface comprises a wired device in communication with said controller.

7. The apparatus for controlling a solar-powered device of claim 1 further comprising a GPS sensor to obtain said location.

8. The apparatus for controlling a solar-powered device of claim 1 further comprising means to return an error message to said user if said minimum energy requirement is greater than said maximum available energy level.

9. The apparatus for controlling a solar-powered device of claim 8 wherein said error message comprises an audible or visible signal.

10. The apparatus for controlling a solar-powered device of claim 1 further comprising at least one lighting element powered by said rechargeable battery.

11. The apparatus of claim 1 wherein said controller is further configured to accept a time period during which said set of operational parameters is to be applied and to operate said solar-powered device according to said set of operational parameters even though said minimum energy requirement exceeds said maximum available energy level at times different than said time period.

12. A solar-powered device, comprising:
at least one rechargeable battery to power said device;
a solar panel operatively coupled to recharge said rechargeable battery;
memory means for storing solar insolation information relating to a location of said solar-powered device;
a user interface for entering a set of operational parameters into said memory means, said set of operational parameters comprising at least one operational parameter; and
a controller for controlling said device based on said solar insolation information and said set of operational parameters;
said memory means comprising computer-readable media containing a code for execution by said controller which, when executed upon initialization of said device, performs the steps of:
determining a maximum available energy level from said solar insolation information;
determining a minimum energy requirement to operate said solar-powered device according to said set of operational parameters;
comparing said minimum energy requirement to said maximum available energy level; and
operating said solar-powered device according to said set of operational parameters only if said minimum energy requirement is less than said maximum available energy level and rejecting said operational parameters during said initialization if said minimum energy requirement exceeds said maximum available energy level.

13. The solar-powered device of claim 12 wherein said controller is configured to receive said location from a user through said user interface.

14. The solar-powered device of claim 13 further comprising a reference means for said user to determine said location.

15. The solar-powered device of claim 14 wherein said reference means correlates said location to a solar zone comprising a geographical area of substantially uniform solar insolation, and said solar zone is entered into said user interface by said user.

16. The solar-powered device of claim 12 wherein said user interface comprises a wireless device in communication with said controller.

17. The solar-powered device of claim 12 wherein said user interface comprises a wired device in communication with said controller.

18. The solar-powered device of claim 12 further comprising a GPS sensor to obtain said location.

19. The solar-powered device of claim 12 further comprising means to return an error message to a user if said minimum energy requirement is greater than said maximum available energy level.

20. The solar-powered device of claim 12 further comprising at least one lighting element powered by said rechargeable battery.

21. The device of claim 12 wherein said computer-readable media performs the additional steps of:
accepting a time period during which said set of operational parameters is to be applied; and
operating said solar-powered device according to said set of operational parameters even though said minimum energy requirement exceeds said maximum available energy level at times different than said time period.

22. A method for operating a solar-powered device, comprising the steps of:
determining a location of said solar-powered device;
correlating said location to a solar insolation level;
determining a maximum available energy level from said solar insolation level;
receiving, upon initialization of said device, a set of operational parameters for said solar-powered device, said set comprising at least one operational parameter;
determining a minimum energy requirement to operate said solar-powered device according to said set of operational parameters;
comparing said minimum energy requirement to said maximum available energy level upon initialization of said device; and operating said solar-powered device according to said set of operational parameters only if said minimum energy requirement is less than said maximum available energy level and rejecting said operational parameters during said initialization if said minimum energy requirement exceeds said maximum available energy level.

23. The method of claim 22 further comprising the step of returning an error message to a user if said minimum energy requirement is greater than said maximum available energy level.

24. The method of claim 23 further comprising the steps of:
accepting an override command from said user in response to said error message; and
operating said solar-powered device according to said set of operational parameters.

25. The method of claim 23 wherein said step of returning an error message comprises providing an audible or visible signal to a user.

26. The method of claim 25 further comprising the step of operating said solar-powered device according to said set of operational parameters after providing said audible or visible signal to said user.

27. The method of claim 22 wherein said step of determining a location of said solar-powered device is carried out with a GPS sensor.

28. The method of claim 22 wherein said step of determining a location of said solar-powered device comprises using reference means to determine said location.

29. The method of claim 28 wherein said reference means comprises a GPS device.

30. The method of claim 28 wherein said reference means comprises a map.

31. The method of claim 22 wherein said step of determining a minimum energy requirement comprises a consideration of at least one piece of operational information selected from the group consisting of: nominal voltage of said battery, quiescent current, current capacity of said battery, charge efficiency of said battery, charge acceptance of said battery, depth of battery discharge of said battery.

32. The method of claim 22 wherein said solar-powered device is a light comprising at least one lighting element.

33. The method of claim 32 wherein said step of determining a minimum energy requirement comprises a consideration of at least one piece of operational information selected from the group consisting of: lighting element driver efficiency, colour of said lighting element, typical voltage of said lighting element, instantaneous current of said lighting element, efficacy of said lighting element, duty cycle, flash duration, optical efficiency, pulse width modulation limits, typical temperature fluctuations during operation, and internal resistance.

34. The method of claim 22 wherein said step of determining a minimum energy requirement comprises a consideration of at least one piece of operational information selected from the group consisting of: nominal power of said solar panel, temperature offset of said solar panel under given conditions.

35. The method of claim 22 wherein said step of calculating a maximum available energy level from said solar insolation level comprises a consideration of at least one piece of operational information selected from the group consisting of: solar insolation levels, average day length, minimum day length, maximum day length, average ambient temperatures, minimum ambient temperatures and maximum ambient temperatures.

36. The method of claim 22 further comprising the steps of:
accepting a time period during which said set of operational parameters is to be applied; and
operating said solar-powered device according to said set of operational parameters even though said minimum energy requirement exceeds said maximum available energy level at times different than said time period.

* * * * *